June 3, 1930.  W. A. SCHATZ  1,761,089
FAUCET
Filed Aug. 4, 1926
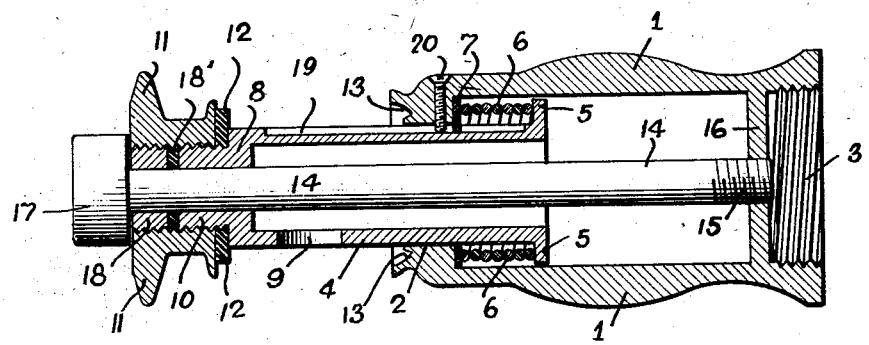

Patented June 3, 1930

1,761,089

UNITED STATES PATENT OFFICE

WILLIAM A. SCHATZ, OF LONG ISLAND, NEW YORK

FAUCET

Application filed August 4, 1926. Serial No. 126,992.

This invention relates to a faucet of improved construction and, although it may be employed to advantage in other association, it is particularly intended for use in connection with the dispensing of beverages and specifically syrups, punches, etc.

It is an object of the invention to provide a device of this character, the parts of which will be relatively few in number and individually simple in design and construction, these parts being assembled to provide a faucet operating over long periods of time and with maximum efficiency with freedom from mechanical difficulty.

A further object of the invention is that of constructing a faucet which may readily be operated and in which the parts when being moved to closed position will not alone interrupt the further flow of fluid but will also serve to prevent any escape of the fluid which was about to be discharged from the faucet when the parts of the latter were moved to closed position. As a consequence, after-drip, which in the case of syrups, sweetened beverages, etc., would be likely to result in a gumming of the parts, is prevented, aside from the fact that the faucet does not become unsightly.

A still further object is that of constructing a faucet in which the flow of fluid may readily be established by the operator and in which said flow will be interrupted immediately upon the parts being returned or released to their normal position.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawing in which:

The figure is a sectional side elevation of one form of faucet embodying the improved construction of the present invention, the same being shown in extended or dispensing position.

In this view 1 indicates an outlet member having an annular flange 2 at its forward end, and being preferably screw threaded as at 3 adjacent its rear end, so that it may be connected with a pipe.

A tube 4 is provided having a cross sectional area substantially equal to the space defined between the inner edge of the flange 2, and this tube having its rear end extending into the bore of the outlet member so that a sliding fit is established between these parts. The rear end of the tube is in the present instance flanged outwardly as at 5 and a spring 6 is interposed between this flange and the flange 2. As a consequence, the tube is normally retracted within the outlet member to a maximum extent, and if desired a washer 7 may be disposed adjacent the inner face of the flange 2 in order to prevent the escape of fluid past this flange and to also exert a wiping action upon the outer face of the tube as the latter is projected, it being noted that the outer end of the tube is closed as at 8 and is formed with an opening 9 through its side wall at a point short of this closed end.

With a view to effecting a projection of the tube the outer closed end thereof may be reduced as at 10 and formed with screw threads. Mounted upon this reduced end portion is a knob 11 in the nature of a collar and having internal screw threads cooperated with the threads of the reduced portion 10, this knob serving to secure a washer 12 upon the tube and adjacent the outer end thereof. This washer provides a valve cooperating with a seat formed in the flange 2 by providing the outer face of the latter with an annular groove 13 forming a lip spaced from the contact between the outlet member and the tube, and it is obvious that when the knob is released the spring 6 will retract the tube to a point at which the washer engages the seat formed by said lip and is firmly pressed on the same positively to seal the opening and to prevent the escape of any fluid between the outlet member and tube.

In order to assist an operator in moving the knob and tube outwardly a rest member is provided which, in the present instance, includes a stem 14 having its inner end extending within the bore of the outlet member and screw threaded as at 15 to engage the correspondingly threaded opening of a cross bar 16 extending across this bore. The body of the stem extends longitudinally within the passage of the tube, through an opening formed in the outer end portion thereof and to a point beyond the outer end of the knob 11 at which it terminates in a head 17, this head serving to limit the outward movement of the knob and consequently the tube, the inward movement of which is limited by the engagement of the washer 12 with the seat 13. In order to prevent the possibility of fluid escaping between the stem 14 and the opening formed in the end portion 8 of the tube, it will be observed that the collar 11 is preferably of such a depth as to accommodate a screw threaded plug 18 which is arranged beyond the reduced portion 10 of the tube, a washer 18′ being interposed between these parts and slidably engaging the stem 14. Thus, in addition to preventing fluid from escaping through the openings provided for the accommodation of the stem, this washer serves to wipe the latter as the tube moves to retracted position, so that the neat appearance of the faucet is maintained.

Finally, it will be noted that the opening 9 extends downwardly and in order during operation to prevent the tube turning, it will be seen that in the present instance the latter has been formed with a longitudinally extending groove 19 in its outer face, into which the lower end of a set screw or pin 20 extends, this screw being carried by the outlet member 1.

After the parts are assembled, and in operation, the outlet member is secured to a pipe connected with a suitable source of a fluid supply. It will be obvious that the tube will normally be retracted to its fullest extent within the bore of the outlet member and with the washer or valve 12 seated within the groove of the flange 2. As a consequence, while the fluid enters the bores of the members 1 and 4 no escape of this fluid will be permitted. If an operator desires to dispense fluid, this may readily be accomplished by grasping the knob 11 with the fingers and bearing against the head 17 so that the former may readily be moved towards the latter, thus bringing the opening 9 to extend to a point beyond the outer end of the member 1, as has been shown in the illustration. Under such conditions it will be obvious that fluid will be free to flow through the passages provided for this purpose, and immediately upon the knob 11 being released it will be understood that the tube under the urging of the spring will be retracted and that during such retraction the washer 18′ will act to wipe any fluid adhering to the stem 14. During such retraction the opening 9 will pass the flange 2, thus interrupting the further flow of fluid, and upon the valve seating within the groove 13 of the flange 2 any after-drip will be prevented.

At this time it will be appreciated that, if desired, the outlet member 2, knob etc. may be formed of brass, and the stem 14 and the head 17 may be provided for example from Monel metal, and for the sake of appearance the metallic parts of the faucet may be silver or nickel-plated. Also it will be understood that when it is necessary to renew any of the washers this may readily be accomplished. For example, in the case of the washer 12 by simply detaching the stem 14 the knob 11 may be removed, thus giving free access to this washer. Likewise, by simply removing plug 18 after removal of the stem the washer 18′ is rendered available.

Thus, among others, the objects specifically aforementioned are achieved, and since certain changes may be made in the above construction, and different embodiments of the invention could be made, without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A faucet including an outlet member having a bore and a tube slidable within said bore, said tube having a closed end extending beyond said member and being formed with an opening through its side wall, and means for normally urging and retaining said tube in retracted position with the opening thereof within said bore, and means associated with said tube for positively sealing the outermost end of said outlet member when said tube is in retracted position.

2. A faucet including an outlet member having a bore and a tube slidable within said bore, said tube having a closed end extending beyond said member and being formed with an opening through its side wall, and a spring cooperating with said tube to normally retain the same in fully retracted position with the opening of the latter within the bore of said outlet member, and means associated with said tube for positively sealing the outermost end of said outlet member when said tube is in retracted position.

3. A faucet including an outlet member having a bore and a tube slidable within said bore, said tube having a closed end extending beyond said member and being formed with an opening through its side wall, the opening of said tube being sealed by said outlet member, and means for preventing rotation of said tube with respect to said outlet member, and means associated with said tube for sealing the outermost end of said outlet member when said tube is in retracted position.

4. A faucet including an outlet member having a bore and a tube slidable within said bore, said tube having a closed end extending beyond said member and being formed with an opening through its side wall, a spring co-operating with said tube to normally retain the same in fully retracted position with the opening of the latter within the bore of said outlet member, one of said first-named members formed with a longitudinally extended groove, and projection associated with the second of the same and extending into said groove whereby to prevent turning of said tube with respect to said member, and means associated with the outer end of said tube for closing the outermost end of the outlet member when the tube is in fully retracted position.

5. A faucet including an outlet member having a bore and a tube slidable within said bore, said tube having a closed end extending beyond said member and being formed with an opening through its side wall, an inwardly extending flange disposed on the outermost end of said outlet member and a valve carried by said tube at a point beyond the opening therethrough, the opening in said tube being positioned to lie within the bore of the outlet member when the tube is in retracted position said valve cooperating with said flange when the tube is in fully retracted position.

6. A faucet including an outlet member having a bore a tube slidable within said bore, said tube having a closed end extending beyond said member and being formed with an opening through its side wall, an inwardly extending flange associated with said outlet member and formed with a groove in its outer face and a valve secured to said tube at a point beyond the opening formed therethrough, said valve extending into the groove of said flange when said tube is in fully retracted position.

7. A faucet including an outlet member having a bore and a tube slidable within said bore, said tube having a closed end extending beyond said member and being formed with an opening through its side wall, means for normally retracting said tube within said outlet member with the opening thereof within a bore and means extending beyond said tube and affording a rest for assistance in projecting the latter.

8. A faucet including an outlet member having a bore and a tube slidable within said bore, said tube having a closed end extending beyond said member and being formed with an opening through its side wall, means tending to normally maintain said tube in retracted position with the opening thereof within a bore, a stem connected with said outlet member and extending adjacent to said tube and beyond the same, and a pull member secured to the outer end of said tube.

9. A faucet including an outlet member having a bore and a tube slidable within said bore, said tube having a closed end extending beyond said member and being formed with an opening through its side wall, a spring within said outlet member and co-operating with said tube to normally maintain the latter in fully retracted position, a flange formed at the outer end of said member, a valve associated with said tube at a point beyond the opening therethrough, said valve cooperating with said flange, a knob secured to said tube at a point beyond said valve, a stem secured to said outlet member and having its body extending within the bore of the same and said tube and beyond the outer end of the latter, and a head secured to said stem.

10. A faucet including an outlet member having a bore and a tube slidable within said bore, said tube having a closed end extending beyond said member and being formed with an opening through its side wall, means for normally retaining said tube in retracted position with the opening thereof within said bore, a valve and valve seat associated with said tube and member and limiting the retraction of the former, a stem and means forming a part of said stem and engageable with said tube to limit the projection thereof.

11. A faucet, including an outlet member having a bore and a tube slidable within said bore, said tube having a closed end extending beyond said member and being formed with an opening through its side wall, the opening of said tube being sealed by said outlet member when the tube is in retracted position, and cooperating means on said outlet member and said tube for positively sealing the outermost end of said outlet member when said tube is in retracted position; the said last-mentioned means on the outlet member comprising a lip spaced from the contact of said member with said tube.

In testimony whereof I affix my signature.

WILLIAM A. SCHATZ.